(12) United States Patent
Sheinkman et al.

(10) Patent No.: US 11,142,828 B2
(45) Date of Patent: Oct. 12, 2021

(54) METHOD FOR APPLYING ULTRAFINE PHOSPHATE CONVERSION CRYSTAL COATINGS

(71) Applicant: PHOSFAN LTD, Barkan (IL)

(72) Inventors: Avraham Sheinkman, Ariel (IL); Itzhac Rozentul, Ariel (IL)

(73) Assignee: PHOSFAN LTD., Barkan (IL)

( * ) Notice: Subject to any disclaimer, the term of this patent is extended or adjusted under 35 U.S.C. 154(b) by 329 days.

(21) Appl. No.: 15/571,834

(22) PCT Filed: Apr. 21, 2016

(86) PCT No.: PCT/IL2016/050427
§ 371 (c)(1),
(2) Date: Nov. 5, 2017

(87) PCT Pub. No.: WO2016/178210
PCT Pub. Date: Nov. 10, 2016

(65) Prior Publication Data
US 2018/0230601 A1    Aug. 16, 2018

Related U.S. Application Data

(60) Provisional application No. 62/157,997, filed on May 7, 2015.

(51) Int. Cl.
*C23C 8/60* (2006.01)
*C23C 22/07* (2006.01)
(Continued)

(52) U.S. Cl.
CPC .............. *C23C 22/78* (2013.01); *C09D 5/002* (2013.01); *C23C 22/07* (2013.01)

(58) Field of Classification Search
CPC ................... C23C 22/78–79; C23C 8/60–62
See application file for complete search history.

(56) References Cited

U.S. PATENT DOCUMENTS 3,619,300 A    11/1971 Heller et al.
5,389,453 A    2/1995 Toyose et al.
(Continued)

FOREIGN PATENT DOCUMENTS

JP    S59159987    9/1984
JP    S62182286    8/1987
(Continued)

OTHER PUBLICATIONS

Jegannathan S. et al. "Performance of Zink Phosphate Coating Obtained by Cathodic Electrochemical Treatment in Accelerated Corrosion Test" Electrochimica Acta, vol. 51, Issue 2, Oct. 10, 2005, pp. 247-256, ISSN 0013-4686, http://dx.doi.org/10.1016/j.electacta.2005.04.020.

(Continued)

*Primary Examiner* — Lois L Zheng
(74) *Attorney, Agent, or Firm* — Mark M. Friedman

(57) ABSTRACT

A method for providing phosphate conversion crystal coating, the method including the steps of: pre-treating a substrate by depositing metal oxide particles on the substrate; treating the substrate with a phosphate coating solution, resulting in the phosphate conversion crystal coating forming (crystallizing) on the substrate.

13 Claims, 2 Drawing Sheets

(51) Int. Cl.
*C23C 22/78* (2006.01)
*C09D 5/00* (2006.01)

(56) References Cited

U.S. PATENT DOCUMENTS

| | | |
|---|---|---|
| 5,429,881 A | 7/1995 | Aono et al. |
| 6,214,132 B1 | 4/2001 | Nakayama et al. |
| 6,276,400 B1 | 8/2001 | Jackson et al. |
| 6,562,474 B1 | 5/2003 | Yoshimi et al. |
| 2004/0112471 A1 | 6/2004 | Moriya et al. |
| 2010/0029814 A1* | 2/2010 | Inbe .............. C09D 5/002 524/186 |
| 2012/0160372 A1 | 6/2012 | Inbe et al. |

FOREIGN PATENT DOCUMENTS

| | | |
|---|---|---|
| JP | H10140371 | 5/1998 |
| WO | 2007117043 | 10/2007 |
| WO | 2009057054 | 5/2009 |
| WO | 2015098653 | 7/2015 |

OTHER PUBLICATIONS

Ogle, K., et al. "Phosphate Conversion Coating, Corrosion; Fundamentals, Testing and Protection" vol. 13a, ASM Handbook, ASM International, 2003, p. 721-719.

3M "Custom Coating Guide for Application of Scotchkote Fusion Bonded Epdxy Coatings" 2006. 8-6111-8373-4-B.

U. S. Army Tacom-Ardec "Phosphate Coating, Heavy, Manganese or Zink Base" MIL-DTL-16232G. Oct. 7, 2000.

"Surface Engineering" Vo 5, ASM Handbook, ASM International, 1994, ISBN: 978-0-87170-384-2.

Fig. 1 as Prior Art taken from Pracocriema spol. s r.o. http://www.pragochema.cz/?start=1&lan=en.

John Donofrio, "zinc phosphating" Metal Finishing vol. 98, Issue 6, 2000, pp. 57-58, 60-73, Elsevier. [abstract] And published again pp. 29-45, metal finishing, 2012, organic finishing guidebook, the essential resource for painter and powder coaters, Elsevier [full article].

* cited by examiner

Prior Art

METHOD FOR APPLYING ULTRAFINE PHOSPHATE CONVERSION CRYSTAL COATINGS

FIELD OF THE INVENTION

The present invention relates to a phosphate conversion coating and, more particularly, to a method of applying ultrafine phosphate conversion crystal coating. The present invention relates to the method of applying ultrafine zinc, manganese and calcium phosphate conversion coatings (PCC) (as well as other materials) on various metals, alloys and non-metals.

Phosphate conversion coating, and especially Zinc, Manganese, Iron, Calcium phosphate and combination conversion crystal coatings, are used as a base for improving adhesion of paints and different organic, silicon-organic and composite coatings, rubber moldings etc. In addition, zinc phosphate coating is applied to increase corrosion protection of metals, where the coating acts as a carrier for specific oil and wax films that are applied over it.

BACKGROUND OF THE INVENTION

An excellent overview of the present state of the art of PCC and in particular Zinc Phosphating process is presented in article by John Donofrio. The article discloses the following:

"Zinc phosphate is a crystalline conversion coating that is formed on a metal substrate, utilizing the chemical reaction between metal ions that have been dissolved in mineral acids and then diluted with water to form the process solution. The mineral acids that are normally used to dissolve the metal ions are nitric acid and phosphoric acid. Metals such as Zinc, Nickel and Manganese are dissolved depending on the process necessary. Accelerators may be added to the phosphating process to increase reaction speed, modify hydrogen elimination and control sludge formation.

Three primary reactions take place:

The first reaction that occurs when the zinc phosphate solution comes into contact with the metal surface is the pickling reaction, in which some metal is dissolved from the surface. In this reaction, a chemical cleaning of the surface takes place. This cleaning affects the adhesion of the coating to the base metal. The free acid of the solution close to the metal surface is consumed because of the dissolution of the metal surface. Metal ions are transferred into the process solution. The type of metal depends on the type of substrate mix being treated.

The second reaction is the coating reaction. Due to the free acid consumption in the liquid-metal interface, pH rises and the metal cations cannot stay soluble in the solution. They react with the phosphate in the solution and deposit on the metal surface as crystalline Zinc Phosphate.

The third reaction is the sludge reaction. The metal ion (Fe++) that dissolved from the pickling reaction is oxidized using the accelerator and precipitate out as sludge. The sludge, created in the process, is normally filtered from the solution utilizing some sort of filter media or equipment.

Special prerinses, applied to the metal surface prior to phosphating, provide a considerable increase in the number of nuclei for phosphate crystallization. This is termed activation of the phosphate coating formation." (Metal Finishing, v. 98, N 6, 2000, pp 57-73)

It is generally accepted in the art that without the first process of base material pickling (when the metal ions are transferred into the process solution), creation of phosphate conversion coating is extremely difficult or even impossible. Therefore, these types of coatings are widely applied on iron, iron pickled alloys and zinc, and less on aluminum Cd, Sn, Ag, Ti, Mn and their alloys. To apply phosphate conversion coating on non pickled materials is an extremely difficult or even impossible process.

Various attempts have been made to improve the PCC process, but each attempt creates more problems. Some of these problems include: the need to heat the materials to high temperatures (e.g. up to ~98° C.), the need for very close monitoring of the chemical solution (usually sending samples to a lab for testing) and/or the need to constantly correct the chemical balance of the materials, expensive processes, the creation of large amounts of sludge (an environmental hazard in and of itself), the periodic need to halt production lines in order to clean out the treatment baths, the actual physically demanding work of cleaning out the baths and so on.

Efforts to reduce the dimensions of the phosphate coating crystals include adding chemical compounds into the refining suspension or phosphating solution, applying additional special baths, etc. All these techniques complicate the coating line equipment, technology and worsen the ecological aspects of the process.

Glossary of Abbreviations

Ag—Silver
Ca—Calcium
Cd—Cadmium
PCC—Phosphate Conversion Coatings
Fe—Iron
Mn—Manganese
MOP—Metal Oxide particles
Ni—Nickel
PCCS—phosphate conversion coating solution
Sn—Tin
Ti—Titanium
Zn—Zinc
ZnO—Zinc Oxide
ZPCCC—Zinc Phosphate Conversion Crystal Coating

SUMMARY OF THE INVENTION

According to the present invention, the surfaces of the parts to be coated are pretreated in a dry process of particle deposition on the surfaces before the wet process of treating the part with a phosphate coating solution.

The resulting process provides a universal procedure for coating all types of substrates, both metallic and non-metallic. The process is greatly simplified when compared with coating processes currently known in the art. The phosphating solution is also simplified, obviating the need for various accelerants and additive chemicals.

Some of the main advantages of the immediate innovation over current processes include:

a) The ability to form ultrafine crystalline conversion phosphate coating structures of required by customer thickness, where the coating has a high rate of adhesion to substrate.

b) The ability to form conversion phosphate coating on any metal or alloy, as well as on nonmetallic substrates.

c) Reducing phosphate conversion coating operating temperature (from the norm). For example, reducing the operational temperature for ZPCCC from between 40° C.-70° C. to 30° C. or less; reducing Manganese phosphate coating from about 90-98° C. to 70° C. and less.

d) Reducing the number of pretreatment operations necessary before the actual conversion phosphate coating operation.

e) Significantly reducing the volume of wastewater that is generated.

f) Significantly reducing the volume of sludge that is generated.

g) Using a simple composition of phosphate solution for the coating operation.

According to the present invention there is provided: A simple and stable process; a phosphate solution that requires monitoring of only three parameters: temperature, acidity (pH) and density (each of these parameters can be controlled automatically); and a closed-loop process with no liquid wastes.

According to the present invention there is provided a method for providing phosphate conversion crystal coating, the method including the steps of: pre-treating a substrate by depositing metal oxide particles on the substrate; treating the substrate with a phosphate coating solution, resulting in the phosphate conversion crystal coating forming (crystallizing) on the substrate.

According to further features in preferred embodiments of the invention described below crystallizing centers form at locations where the metal oxide particles were deposited prior to the treating of the substrate with the phosphate coating solution.

According to still further features in the described preferred embodiments the metal oxide particles are selected from the group including: CaO, ZnO, MnO, NiO and combinations thereof.

According to still further features the metal oxide particles are deposited on the substrate in a quantity of between 0.5 and 100 g/m$^2$.

According to still further features the largest dimension of any of the metal oxide particles is less than 2 μm.

According to still further features the phosphate coating solution comprises oxides diluted in phosphoric acid, the oxides selected from the group including: Calcium Oxide, Zinc Oxide, Manganese Oxide and combinations thereof.

According to still further features the phosphate coating solution comprises phosphates selected from the group including: Zinc Phosphates, Manganese Phosphates, Calcium Phosphates and mixtures thereof.

According to still further features the phosphate coating solution including Zinc Phosphates reacts with the metal oxide particles at a temperature of up to 35° C.

According to still further features the phosphate coating solution including Manganese Phosphates reacts with the metal oxide particles at a temperature of up to 70° C.

According to still further features the phosphate coating solution has a pH range of between 2.2 and 2.7.

According to still further features the phosphate coating solution has a phosphate density of between 1.03 and 1.08 kg/l.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
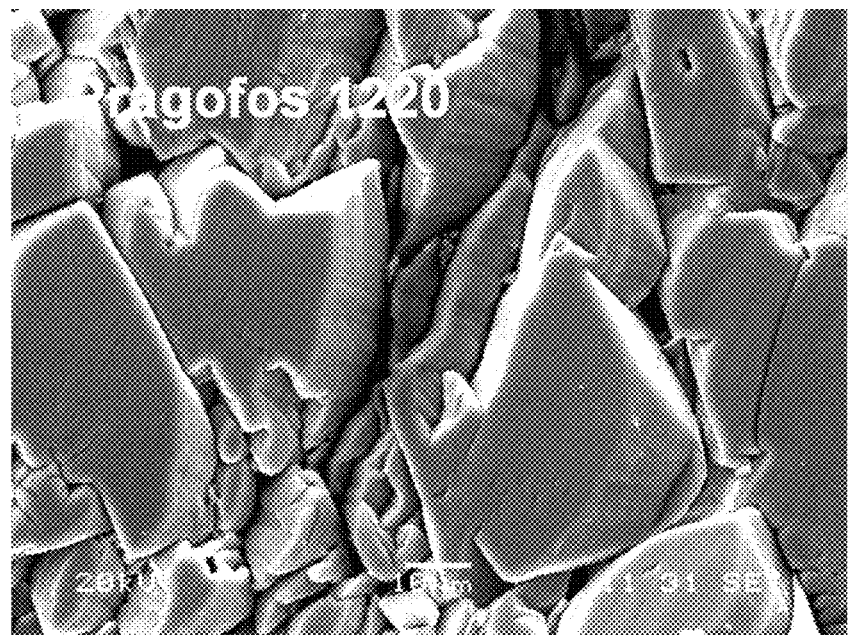
FIG. 1 is an image from an electron microscope of a prior art phosphate conversion coating.

The principles and operation of a phosphate conversion coating process according to the present invention may be better understood with reference to the drawings and the accompanying description.

The present method is exemplarily illustrated using Zinc phosphate conversion crystal coating (ZPCCC), although it is made clear that Calcium, Iron and Manganese phosphates can be used in place of, or in addition to, the Zinc phosphate. Alternative or additional materials are known in the art and included within the scope of the invention.

State of the Art for Phosphate Conversion Crystal Coating

As was described above, ZPCCC, as an example, is formed on a metal substrate by transforming phosphate ions and Zn ions from a liquid phase into a solid phase on the substrate surface of the treated parts. The process of phosphate.

By contrast, in order to form non-diluted Zn phosphate (i.e. crystals) from a diluted Zn phosphate, there is a need for a chemical process to take place. Chemical processes transform diluted one- and two-substituted Zn phosphate compounds into a non-diluted three-substituted $Zn_3(PO_4)_2$ compound. These chemical processes require suitable solution acidity (pH level) and temperature. The suitable pH (usually higher than pH2) level depends on the composition of the solution. The temperature is controlled by conventional heating means. When the pH and the temperature of the solution reach the desired critical levels, the non-diluted $Zn_3(PO_4)_2$ zinc phosphate compound forms spontaneously. The compound forms across the entire solution volume as a fine crystal white powder precipitant.

The phenomenon of spontaneous formation of the fine crystal precipitant will occur within the entire solution volume, making the previously clear solution into a murky solution. More importantly, in such a case, the phosphate coating will not form only on the surfaces of the treated parts. This is obviously not desirable. On the other hand, if the same conditions of the solution are achieved only in a thin layer of solution above the surface of the treated substrate, then the phosphate coating will form on the substrate.

In order for the precipitant to only be created in a thin layer above the surface of the substrate—and not in the entire solution—the solution is engineered in such a way that when the solution comes into contact with the metal surface, the chemical reaction of the metal material and phosphoric acids in the solution results in the pH rising—only in the localized area near the surface of the substrate—and once the pH reaches a particular level (e.g. 2.2), and the suitable temperature is achieved, the conversion from soluble to non-soluble occurs and a PCC layer forms on the surface (in the immediate example, the PCC is a Zinc PCC, but alternative and/or additional phosphates can be used including Iron, Manganese, Calcium or mixtures thereof).

The usual temperatures for such processes for forming heavy Zn and Mn phosphate coatings vary from 70 to 98° C. For thin phosphate coatings, it is possible to reduce this temperature to around 40° C. for ZPCCC by adding additional components into the phosphating solution.

This type of coating process, even with additional operations for refining the phosphate crystals, still forms a coating with very coarse, flat crystal structures. Typically, the main crystals can reach dimensions of tens of microns. Referring now to the drawings, FIG. 1 is an image from an electron microscope of a prior art phosphate conversion coating. (Source: Pragochem spol. s r.o., http://www.pragochema.cz/?start=1&lan=en.) The image shows a structure of a standard, heavy Zinc phosphate conversion coating. As is evident from the image, the main crystals have dimensions on the scale of tens of microns.

Phosphate coatings with coarse crystalline structures have less effective operating characteristics. Liquids can penetrate the coating more easily between the coarse structures, reach the substrate surface and initiate its corrosion. Therefore, refining these coating structures and receiving coatings with finer structures, which are more densely packed together, are traditional goals in the development of new phosphate coating technologies.

The dimensions (size) of the crystals of the phosphate coating depends on the initial concentration of crystallization centers and, consequently, the number of areas where crystals simultaneously start forming/growing. The more densely packed the crystals are, the smaller they are, as there is less room to grow before colliding with the neighboring crystals. One way of achieving more densely packed crystals is by seeding many crystallization centers for the crystals start growing.

If there is any solid surface already in the solution volume, when the new crystallization phase begins, the process of forming crystallization centers on the solid surfaces requires much less energy compared to the energy needed to create the same crystallization centers in the solution volume, further away from the solid surface. Therefore, it is possible to create the situation whereby the new crystal phase will form on the solid surface only (or almost exclusively), and not elsewhere in the solution volume.

Furthermore, in order for crystals to form, the solution has to react with something which will trigger the crystallization phase. A metallic surface therefore serves both to create the reaction (transformation from diluted to non-diluted) and is also the best place on which the crystals can form.

To summarize: The forming of phosphate coatings with required properties needs two main chemical processes.

(1) Pickling of the substrate metal in the phosphating solution.

(2) Simultaneous creation of many crystallization centers on the substrate surface.

In practice, each of these processes is optimized separately. (1) The substrate metal pickling can be accelerated, for example, by increasing the temperature or by increasing the activity of the phosphate solution (e.g. by adding additional chemicals) or by substituting a less diluted substrate metal with a more pickled one.

(2) Stimulating the creation of the crystallization centers may be done by immersion of the treated part into a water suspension including very fine solid particles or by the addition of such particles directly into the bath with the phosphating solution.

The present innovative method, explained in detail below, includes a pretreatment of the substrate surface by depositing Zinc oxide (ZnO) on the surface. Other metallic oxides may be used in addition to, or instead of, the Zinc Oxide. Therefore it is made clear that the use of ZnO is merely exemplary and not intended to be limiting.

In the first step, any dry process is used to deposit, adhere, and/or adsorb ultrafine ZnO crystals on the surface of a target substrate. Innovatively, the target substrate that is to be treated can essentially be of any material, not only metal.

In the next step, the aforementioned target part is treated in a wet process with a solution for phosphate coating. The wet process can be, for example, an immersion bath, or solution spray and the like. The solution can even be at room temperature (in contradistinction to the high temperatures needed in contemporary methods). The active chemical reaction starts immediately.

Importantly, the chemical reaction occurs on the surface of the piece of material as the ZnO reacts with free phosphoric acid in a thin adsorption layer on the surface of the substrate. That is to say that the chemical stability of mono- and di-substituted phosphate compositions reduce/react and transform into the non-soluble trisubstituted phosphate. The initial particles of trisubstituted phosphate present as crystallizing centers for non-stable mono- and disubstituted phosphate complexes on which these non-stable complexes are transformed into the non-soluble trisubstituted phosphate and on which the phosphate crystals grow. The number of such crystal centers depends on the concentration of ZnO particles on the treated surface. The phosphate crystals are prevented from growing overly large by increasing the number of crystal centers. Therefore, the higher the concentration of ZnO particles on the surface, the more densely packed the crystals will be and hence the finer the crystals will be.

Other oxides, metals, alloys or other chemical compounds react in the same or similar manner. Generally, fine particles of such materials have to be fixedly adhered on the surface of the treated material. These particles may function as crystallizing centers for trisubstituted phosphate of Zinc, Manganese and/or Calcium.

Innovative Process

The present innovative method supposes to deposit solid particles of oxides, metals, alloys or other chemical compounds on the surface that is to be treated, before initiating the phosphate conversion coating process (e.g. before inserting the metal part into the coating bath or before spraying the coating solution onto the target part). As mentioned, the particles function as crystallizing centers for trisubstituted phosphate of Zinc, Manganese and/or Calcium.

As mentioned above, the method includes pretreating a target part by depositing ultra fine ZnO crystals on the surface of the target part (using any deposition method). Once pretreated, the target part is exposed to the phosphate conversion coating solution (usually by immersing the part in the solution, although the immediate method is not limited to immersion). The solution may even be at room temperature. The active chemical reaction will start immediately.

In order for the aforementioned process to work, the solid particles need to meet the following conditions: (1) The particles must be sufficiently small (e.g. from a fraction of a micron up to preferably 2 microns in size, referred to herein as ultrafine particles); and (2) the particles must be able to adhere or attach to the surface of the substrate in a sufficiently strong manner.

The first condition may be realized by simply acquiring particles in the preferred size range. For example, the pretreatment particles can be ultrafine ZnO particles of between 0.5 and 2 microns. One of the simplest and cheapest methods for particle deposition or causing the particles to be adsorbed on the part is to use particle deposition from an aerosol, which is a colloid of fine solid particles in air or another gas. The part is placed into such a colloid, to adsorb the aerosol particles. The concentration of the particles on the surface depends on the concentration of particles in the aerosol and on the period of treatment (dwelling time). The longer the piece of material stays in the aerosol, the more particles settle on the surface.

One exemplary apparatus for making such as aerosol is fluidized bed aerosol generator, such as Fluidized Bed Aerosol Generator 3400a, manufactured by TSI Inc. St. Paul, Minn., USA. The generator contains a fluidized bed chamber and a powder reservoir. The fluidized bed consists of 100-μm bronze beads supported by a porous screen that allows clean, dry air to pass through, yet prevents the passage of any powder. The air or other gas is pumped from the bottom of the chamber through the powder layer. The powder particles are dispersed by the gas and create the aerosol in the cavity above the powder layer. The best advantages of the aforementioned exemplary aerosol generator are stable output and concentration.

The second condition is also easily realized. The surface of each of the treated parts is usually coarse and activated enough with chemical bonds, such as metallic bonds and Van-der-Waals forces, for small particles to collect and adhere to the surface. If the volume of particle adhesion is insufficient, the treated surface can be mechanically activated. In addition, the surfaces of the small solid particles are also active, due to their small dimensions. These two factors provide for sufficiently high adhesion of any adsorbed/deposited particles.

Phosphating Solution—State of the Art

Regular phosphate conversion coating liquids known in the art usually contain several additional components, besides for the $(PO_4)^{-3}$ anions and $Zn^{+2}$ (or similar) cations. One exemplary known chemical composition of such a solution, which is fairly typical in the art, has the following composition:

| Component | Type of component | Concentration range, g/l |
|---|---|---|
| $Zn^{+2}$ | Cations | 0.5 . . . 2 |
| $(PO_4)^{-3}$ | Anions | 10 . . . 20 |
| $(NO_3)^{-}$ | Anions | 1 . . . 30 |
| $Ni^{+2}$ | Cations | 0.5 . . . 2 |
| $Co^{+2}$ | Cations | 0.5 . . . 2 |

The acidity range of this solution is pH 2-3 and the temperature range is 40-70° C.

The serious pollutants and heavy metals are clearly evident. Other processes known in the art further or alternatively include different organic compounds. The complex chemical compositions known in the art, which also include undesirable compounds, suffer from many drawbacks in real world production. Some of these problems include:

a) The need for frequent laboratory testing of the phosphate solution chemical composition.

b) The need for frequent phosphate solution chemical composition correction.

c) The solutions contain ions such as $Ni^{+2}$, $Co^{+2}$, $(NO_3)^{-}$ etc. as well as poisonous and/or hazardous organic components which require additional expensive equipment for pollution prevention and waste treatment as well as staff safety provisions.

d) The relatively high operational temperature of the phosphating conversion coatings liquids baths, even up to about 97° C. A great amount of energy is needed to maintain such a high operational temperature, which in turn increases expenses, as well as additional expenses for safety-provisions, all the while contributing to the greenhouse effect and the like.

e) One of the specific, well-known problems is a huge volume of sludge.

Phosphating Solution—Present Innovation

By contrast, the immediate innovative process for pretreating surfaces with metal oxide particles (MOP) significantly reduces the operational temperature needed for forming the phosphate conversion coating and simplifies the chemical composition of the PCCS.

The aforementioned particles are the basic components necessary for conversion phosphate coating forming. Due to the high chemical activity of the material particles with the phosphate conversion coating solution (PCCS), there is no need for the substrate itself to chemically react with the solution (i.e. no need for substrate pickling), nor is there a need for elevated temperatures to realize the formation phosphate conversion coating. For example, the chemical reaction of ZnO with $(PO_4)^{-3}$ ions from the solution occurs even at room temperature.

When the phosphating solution reacts with the deposited aerosol particles, the pH of the PCCS increases at the interface layer. The increase in solution pH is sufficient for: the creation of non-soluble phosphate conversion coating compound, growth of the crystalizing centers and formation of the phosphate conversion coating on the treated substrate.

The entire process is accomplished without necessarily pickling the substrate material. As such, there is no need for adding any coating-forming acceleration compounds into the solution. Therefore, the phosphating solution is greatly simplified, without having the need for any unnecessary and/or dangerous chemicals.

Furthermore, according to the immediate innovative process, it is possible to form phosphate conversion coating on surfaces of materials which do not, themselves, react with PCCS, such as stainless steels, titanium alloys, plastics, glass etc.

The resulting simple chemical composition of PCCS is very easily controlled. Only two solution parameters, besides for the temperature, have to be controlled and corrected: 1. solution density and 2. solution pH. The properties of the coatings that are formed can be varied by varying these parameters. Experiments have shown that by varying the Zinc PCCS density between 1.03 and 1.08 kg/1, it is possible to form Zinc phosphate conversion coating with a thickness (measured in weight) ranging between 3 and 60 g/m$^2$ where the pH is constant at approximately 2.55. Alternatively, while keeping the density constant at 1.06 kg/1 and varying the pH of the solution between 2.2 and 2.7, the coating thickness varies between 4 and 40 g/m$^2$, when the solution is at a temperature of 30° C.

In preferred embodiments, the phosphate coating solution has a pH range of between 2.2 and 2.7. In preferred embodiments the phosphate coating solution has a phosphate density of between 1.03 and 1.08 kg/l.

In preferred embodiments, the metal oxide particles used in the pretreatment of the substrate are selected from the group including: CaO, ZnO, MnO, NiO and combinations thereof.

In preferred embodiments, metal oxide particles are deposited on the substrate in a quantity of between 0.5 and 100 g/m$^2$. The greater the quantity of metal oxide particles that are deposited, the larger the number of crystallizing centers that form on the substrate. The more crystallizing centers, the more crystals form and, as a result, the smaller the crystal size/dimension. In preferred embodiments, the largest dimension of any of the metal oxide particles is less than 2 μm.

In preferred embodiments, the phosphate coating solution comprises oxides diluted in phosphoric acid. Preferably the oxides are selected from the group including: Calcium Oxide, Zinc Oxide, Manganese Oxide and combinations thereof.

Preferably the phosphate coating solution comprises phosphates. These phosphates are preferably selected from the group of: Zinc Phosphates, Manganese Phosphates, Calcium Phosphates and mixtures thereof. In one embodiment, where the phosphate coating solution comprises Zinc phosphates, the solution reacts with the metal oxide particles on the pre-treated substrate at a temperature of up to 35° C. In another embodiment, where the phosphate coating solution comprises Manganese Phosphates, the solution reacts with the metal oxide particles at a temperature of up to 70° C.

Figure 2:
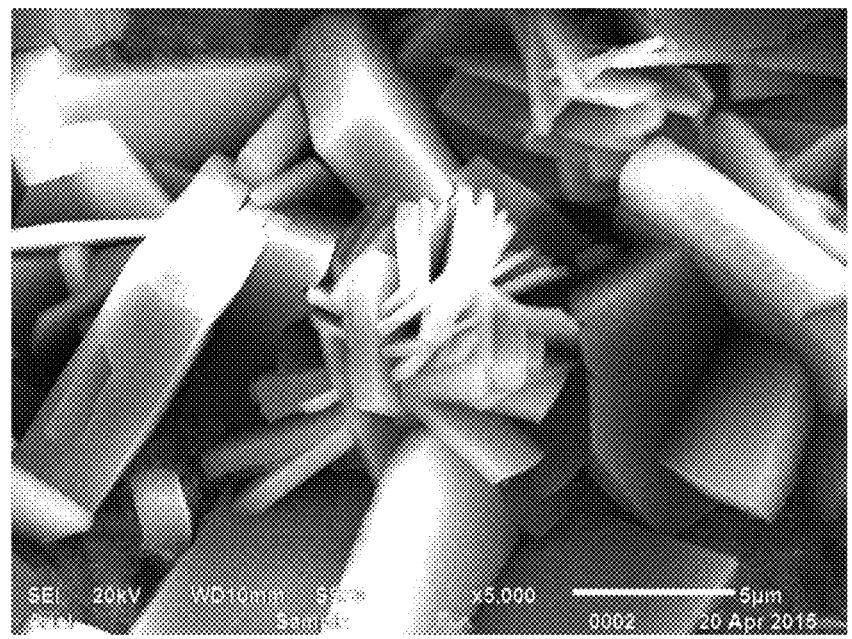
FIG. 2 is an image from an electron microscope of a heavy Zinc phosphate conversion coating using the immediate method.

FIG. 2 is an image from an electron microscope of a heavy Zinc phosphate conversion coating using the immediate method. In contrast to the crystals of the prior art coating, the crystals formed using the immediate invention have much smaller dimensions. In FIG. 2 the structure of present invention Zinc Phosphate conversion coating has a thickness (measured by weight) of 15 $g/m^2$. The dimensions of the crystals are measured on a scale of 5 microns. It is clear from the image that the main crystals are only, at the most, several microns in size. Exemplary measurements, taking from FIG. 2, show crystals between about 2-9 microns. As mentioned, these dimensions are merely exemplary and not intended to be limiting (on either side of the spectrum). Even the biggest phosphate crystals are about 10 times finer than crystals in coating formed using processes known in the art (see for example FIG. 1).

Figure 3:
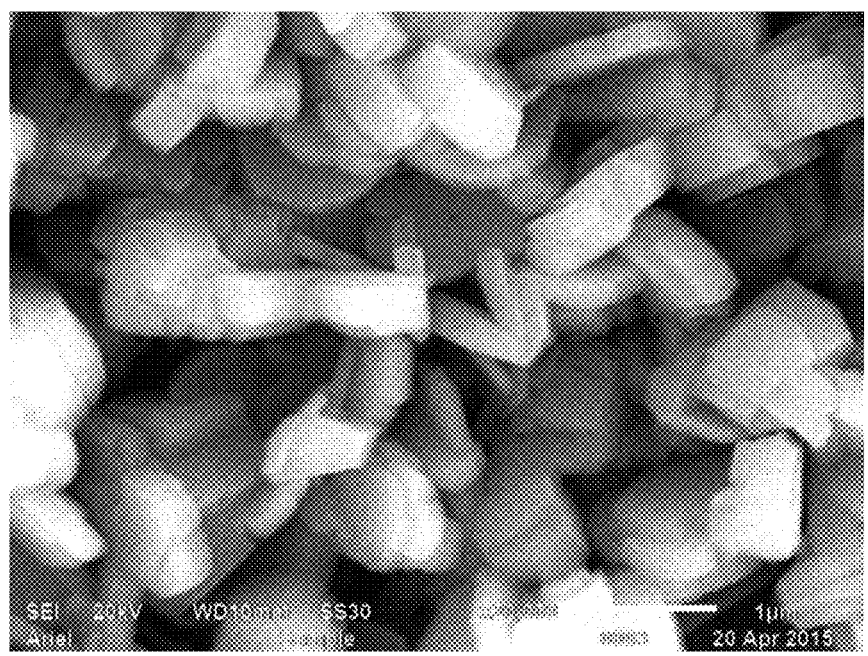
FIG. 3 is an image from an electron microscope of a Zinc phosphate conversion coating formed using the immediate method.

As the coating thickness increases, the phosphate crystals grow. Therefore the crystal in thinner coatings will have smaller dimensions. FIG. 3 is another image from an electron microscope of a Zinc phosphate conversion coating formed using the immediate method. The displayed Zinc Phosphate conversion coating is thinner than the coating of FIG. 2, having a thickness of 6 $g/m^2$. In FIG. 3 the dimensions of the crystals are measured on a scale of one micron. It is evident that the main crystals are less than a micron in size. In the exemplary image, measurements are between about 0.2-3 microns. As mentioned, these dimensions are merely exemplary and not intended to be limiting (on either side of the spectrum).

Figure 4:
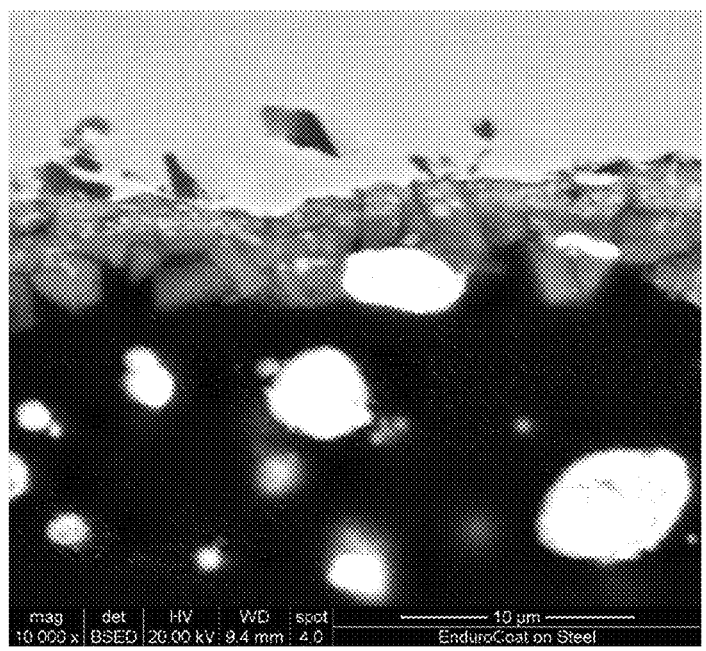
FIG. 4 is an image from an electron microscope of a cross-sectional view of the heavy Zinc phosphate conversion coating of FIG. 2.

FIG. 4 is an image from an electron microscope of a cross-sectional view of the heavy Zinc phosphate conversion coating of FIG. 2. The thickness of the coating, measured in weight, is 15 $g/m^2$. The good adhesion of the coating crystals with the substrate surface gives a result of the very solid and uniform coating structure with minimal non-coated substrate surface areas (e.g. as seen in FIG. 4). The inventive coating is used as a pre-treatment for subsequent coating of the part with paints, topcoats, rubber and plastic moldings. The good adhesion between the coating and the The present invention successfully addresses all of the drawbacks and deficiencies of the phosphate conversion coating processes known in the art. The PCCS according to the present invention has higher stability than similar solutions known in the art and is minimally hazardous for both the workers and the environment. The operational parameters of the solution are also easy corrected. For example, the parameters of the solution can be corrected by adding the required quantity of PCCS concentrate containing $(PO_4)^{-3}$ and $Zn^{+2}$, $Mn^{+2}$ or $Ca^{+2}$ ions, depending on type of conversion coating.

In experiments, the following equipment was used:

1. A fluidized bed aerosol generator was used. The generator value is ~0.3 $m^3$ and operation value ~0.25 $m^3$. The quantity of modification material varied from 0.1 to 3 kg, for varying aerosol concentrations. The optimal period for surface modification of the treated samples was found to be three minutes.
2. The concentration of deposited aerosol particles was measured by weighing the treated samples before and after deposition. A semi-analytical scale by Ragway Company, Poland, having an accuracy of 0.001 g was used for weighing samples.
3. The density of the solutions was measured with suitable hydrometers have an accuracy of 0.01 kg/l.
4. The acidity of the solutions was measured with a Milwaukee pH-meter P-600, by Milwaukee Instruments, Inc., Rocky Mount, N.C., USA, with glass electrode, having an accuracy of 0.01.
5. The phosphate coating thickness on the treated samples was measured by weighing of the coated samples after coating and after coating stripping according the MIL-DTL-16232G specification.
6. The test samples were produced from 1020 steel, 101 copper, 316 stainless steel, 2014 aluminum alloy, polypropylene, annealed glass.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for providing phosphate conversion crystal coating, the method comprising the steps of:

pretreating a substrate in a dry process by depositing metal oxide particles on said substrate;

treating said substrate with a phosphate coating solution, resulting in the phosphate conversion crystal coating forming on said substrate.

2. The method of claim 1, wherein crystallizing centers form at locations where said metal oxide particles were deposited prior to said treating of said substrate with said phosphate coating solution.

3. The method of claim 1, wherein said metal oxide particles are selected from the group comprising: CaO, ZnO, MnO, NiO and combinations thereof.

4. The method of claim 1, wherein said metal oxide particles are deposited on said substrate in a quantity of between 0.5 and 100 g/m2.

5. The method of claim 1, wherein a largest dimension of any of said metal oxide particles is less than 2 μm.

6. The method of claim 1, wherein said phosphate coating solution comprises oxides diluted in phosphoric acid, said oxides selected from the group comprising: Calcium Oxide, Zinc Oxide, Manganese Oxide and combinations thereof.

7. The method of claim 1, wherein said phosphate coating solution comprises phosphates selected from the group comprising: Zinc Phosphates, Manganese Phosphates, Calcium Phosphates and mixtures thereof.

8. The method of claim 7, wherein said phosphate coating solution comprising Zinc Phosphates reacts with said metal oxide particles when said phosphate coating solution is at a temperature of up to 35° C.

9. The method of claim 7, wherein said phosphate coating solution comprising Manganese Phosphates reacts with said metal oxide particles when said phosphate coating solution is at a temperature of up to 70° C.

10. The method of claim 1, wherein said phosphate coating solution has a pH range of between 2.2 and 2.7.

11. The method of claim 1, wherein said phosphate coating solution has a phosphate density of between 1.03 and 1.08 kg/l.

12. The method of claim 1, further comprising the steps of:
   pretreating said substrate with said phosphate coating formed thereon by depositing additional said metal oxide particles on said coated substrate;
   treating said pretreated coated substrate with said phosphate coating solution, resulting in a second phosphate crystal coating layer forming on said coated substrate.

13. The method of claim 12, further comprising:
   repeating said pretreating and treating steps until a desired number of coating layers is formed on said substrate.

* * * * *